United States Patent
McGrath et al.

(10) Patent No.: US 9,552,726 B2
(45) Date of Patent: Jan. 24, 2017

(54) PROVIDING DRIVING CONDITION ALERTS USING ROAD ATTRIBUTE DATA

(75) Inventors: Timothy A. McGrath, Chicago, IL (US); Matthew G. Lindsay, San Jose, CA (US)

(73) Assignee: HERE Global B.V., Eindhoven (NL)

(*) Notice: Subject to any disclaimer, the term of this patent is extended or adjusted under 35 U.S.C. 154(b) by 1188 days.

(21) Appl. No.: 12/546,123

(22) Filed: Aug. 24, 2009

(65) Prior Publication Data

US 2011/0043377 A1    Feb. 24, 2011

(51) Int. Cl.
*G08G 1/09* (2006.01)
*G08G 1/0967* (2006.01)
*G07C 5/00* (2006.01)

(52) U.S. Cl.
CPC ........... *G08G 1/09675* (2013.01); *G07C 5/008* (2013.01); *G08G 1/096775* (2013.01)

(58) Field of Classification Search
CPC .. G08G 1/0129; G08G 1/0133; G08G 1/0104; G08G 1/093; G08G 1/096827; G08G 1/20; G08G 1/0112; G08G 1/127; G08G 1/0125; G01C 21/3691; G01C 21/26; H04W 24/02; H04W 4/02; H04W 24/08; G06Q 30/0207; G06Q 10/08; G06Q 10/0631; G06Q 10/0635; G06Q 10/06375; G06Q 10/10; G06Q 10/103; G06Q 20/14; G06Q 20/22; G06Q 30/0201; G06Q 30/04
USPC ....... 340/905, 425.5, 435, 439, 903, 995.13, 340/7.48; 701/117, 423, 119, 414, 415, 701/301; 455/414.3
See application file for complete search history.

(56) References Cited

U.S. PATENT DOCUMENTS

| | | | | |
|---|---|---|---|---|
| 5,539,645 A | * | 7/1996 | Mandhyan et al. | 701/119 |
| 5,978,737 A | * | 11/1999 | Pawlowski et al. | 701/301 |
| 5,999,635 A | * | 12/1999 | Higashikubo | G06K 9/00785 340/934 |
| 6,253,146 B1 | * | 6/2001 | Hanson et al. | 701/414 |
| 6,317,686 B1 | | 11/2001 | Ran | 701/210 |
| 6,415,226 B1 | * | 7/2002 | Kozak | G01C 21/3461 340/988 |
| 6,587,787 B1 | * | 7/2003 | Yokota | 701/532 |
| 6,603,407 B2 | | 8/2003 | Endo et al. | 340/995 |
| 6,741,932 B1 | * | 5/2004 | Groth et al. | 701/520 |
| 6,753,784 B1 | | 6/2004 | Sznaider et al. | 340/601 |
| 6,845,324 B2 | | 1/2005 | Smith | 702/3 |
| 6,895,310 B1 | | 5/2005 | Kolls | 701/1 |
| 6,990,407 B1 | * | 1/2006 | Mbekeani et al. | 701/117 |
| 7,050,903 B1 | * | 5/2006 | Shutter et al. | 701/117 |
| 7,096,115 B1 | * | 8/2006 | Groth et al. | 701/117 |
| 7,139,659 B2 | * | 11/2006 | Mbekeani et al. | 701/117 |
| 7,206,837 B2 | | 4/2007 | Seligmann | 709/224 |
| 7,251,558 B1 | * | 7/2007 | McGrath | 701/117 |
| 7,269,503 B2 | * | 9/2007 | McGrath | 701/117 |

(Continued)

*Primary Examiner* — Mirza Alam
(74) *Attorney, Agent, or Firm* — Lempia Summerfield Katz LLC

(57) ABSTRACT

A method and system for providing a driving condition alert to vehicle drivers and others are disclosed. The alert is provided based on road location and attribute data; real-time, historic, and forecast traffic data; real-time, historic, and forecast weather data; and/or scheduled and unscheduled event data. The alert may include information indicating the reason for the alert provided. In addition, the alert may include a relative scale of hazard (e.g., a scale of 1-10 with 1 representing no hazard and 10 representing the highest hazardous condition). As a result of receiving the alert, the driver may adjust their route or driving behavior.

16 Claims, 6 Drawing Sheets

(56) References Cited

U.S. PATENT DOCUMENTS

| | | | |
|---|---|---|---|
| 7,275,089 B1 | 9/2007 | Marshall et al. ............. 709/219 |
| 7,302,341 B1 | 11/2007 | Auxer et al. |
| 7,307,513 B2* | 12/2007 | Shutter et al. ........... 340/995.13 |
| 7,486,201 B2* | 2/2009 | Kelly ............... G08G 1/096716 |
| | | | 340/905 |
| 7,516,010 B1* | 4/2009 | Kaplan et al. ................ 701/426 |
| 7,538,690 B1* | 5/2009 | Kaplan et al. ............. 340/932.2 |
| 7,791,503 B2* | 9/2010 | Breed et al. .................. 340/993 |
| 7,805,239 B2* | 9/2010 | Kaplan et al. ................ 701/426 |
| 7,899,611 B2* | 3/2011 | Downs et al. ................ 701/117 |
| 7,949,464 B2* | 5/2011 | Kaplan et al. ................ 701/426 |
| 8,024,111 B1* | 9/2011 | Meadows et al. ............ 701/414 |
| 8,396,663 B2* | 3/2013 | Tennent et al. ............... 701/532 |
| 2004/0143385 A1 | 7/2004 | Smyth et al. |
| 2005/0065711 A1* | 3/2005 | Dahlgren ................ G01C 21/26 |
| | | | 701/117 |
| 2005/0137753 A1* | 6/2005 | Basson et al. ..................... 701/1 |
| 2006/0106530 A1* | 5/2006 | Horvitz et al. ............... 701/117 |
| 2006/0253246 A1 | 11/2006 | Cera et al. .................... 701/117 |
| 2007/0027583 A1* | 2/2007 | Tamir ................. G06Q 30/0283 |
| | | | 701/1 |
| 2007/0208492 A1* | 9/2007 | Downs ................ G08G 1/0104 |
| | | | 701/117 |
| 2008/0092162 A1 | 4/2008 | Lundy et al. .................... 725/35 |
| 2009/0160873 A1 | 6/2009 | Kew et al. ..................... 345/629 |
| 2009/0284361 A1* | 11/2009 | Boddie et al. ................ 340/439 |
| 2009/0299622 A1 | 12/2009 | Denaro ......................... 701/201 |
| 2010/0207787 A1* | 8/2010 | Catten et al. ................. 340/905 |
| 2012/0271542 A1* | 10/2012 | Arcot et al. .................. 701/411 |

* cited by examiner

PROVIDING DRIVING CONDITION ALERTS USING ROAD ATTRIBUTE DATA

FIELD

The present invention relates generally to providing vehicle drivers and others with information regarding driving conditions and, more particularly, to providing driving condition alerts using road attribute data in conjunction with other data, such as road location, traffic, weather, and/or event data.

BACKGROUND

Weather conditions may impact driving conditions. For example, rain, snow, and sun glare may all slow vehicle speed. These weather conditions may also cause traffic congestion and other traffic incidents, such as vehicle accidents. Thus, it is beneficial for a driver to know not only the weather conditions, but how these conditions impact traffic.

Systems have been developed to provide drivers with alerts based on both traffic and weather data. These alerts may be provided for a road or area. For example, an alert may warn that traffic on a stretch of a highway is congested due to a thunderstorm in the area. These alerts may also be customized for an individual driver who has specified his planned route. For example, a driver may use a navigation system to specify a route and based on the specified route, the driver may receive an alert that the driver will experience slow driving conditions due to rain in the area of the specified route.

Some of these systems may use map data to display weather and/or traffic conditions on a map. The map data is stored in a geographic database and includes road location data that can be used to generate a map of a geographic area. As a result, a driver may receive visual information regarding the impact of weather and/or traffic conditions on the driver's planned route.

A geographic database may include more data than is used for generating a map. For example, the geographic database may include data representing curvature, grade, bank, lanes, bridges, tunnels, road warning signs, and so on. This data may be stored in the geographic database for reasons other than map display, such as for route calculation and route guidance. This data may also be used by Advanced Driver Assistance Systems (ADAS), such as adaptive headlight aiming, adaptive cruise control, lane departure warning and control, curve warning, speed limit notification, predictive cruise control, and adaptive shift control.

It would be beneficial to use this additional data in the geographic database to provide driving condition alerts.

SUMMARY

A method and system for providing driving condition alerts are disclosed. The method includes obtaining road location data, road attribute data, and at least one of traffic data, weather data, and event data. The road attribute data, the traffic data, the weather data, and the event data are associated with the road location data. The method further includes analyzing the road attribute data with the other obtained data to determine whether an alertable condition exists. If an alertable condition exists, the method generates and transmits a driving condition alert.

The road attribute data includes data that represents features of a road that can impact driving conditions. For example, the road attribute data includes data representing the shape of the road (e.g., slope, elevation, and grade), lane characteristics of the road, regulations associated with the road, road type, and warning signs located adjacent to the road.

The traffic data includes real-time, forecast, and historic traffic data. The weather data includes real-time, forecast, and historic weather data. The event data includes data representing scheduled and unscheduled civic, social, and sporting events.

Analyzing the road attribute data with the other obtained data may include using a data baseline to start the analysis. The data baseline is organized by location and time. For each location, the data baseline includes the road attribute data. For each time for a location, the data baseline includes historic traffic data and historic weather data.

Analyzing the road attribute data with the other obtained data includes using at least one analytical methodology. The analytical methodology may be one or more of a decision tree, an object model, a neural network, and a genetic algorithm.

The method may also include calculating a score representative of driving conditions and transmitting the score with the driving condition alert.

The system for providing driving condition alerts includes a receiver for receiving real-time traffic data, forecast traffic data, real-time weather data, forecast weather data, and event data. The system further includes a data store for storing the real-time traffic data, the forecast traffic data, the real-time weather data, the forecast weather data, the event data, historic traffic data, historic weather data, and map data. The map data includes road location data and road attribute data.

The system also includes a driving condition application having routines to analyze the data in the data store and to determine whether an alertable driving condition exists. The driving condition application makes the determination by using at least the road attribute data in combination with at least one of the traffic, the weather, and the event data. A processor executes the driving condition application and a transmitter transmits driving condition alert messages when the driving condition application determines that an alertable driving condition exists.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
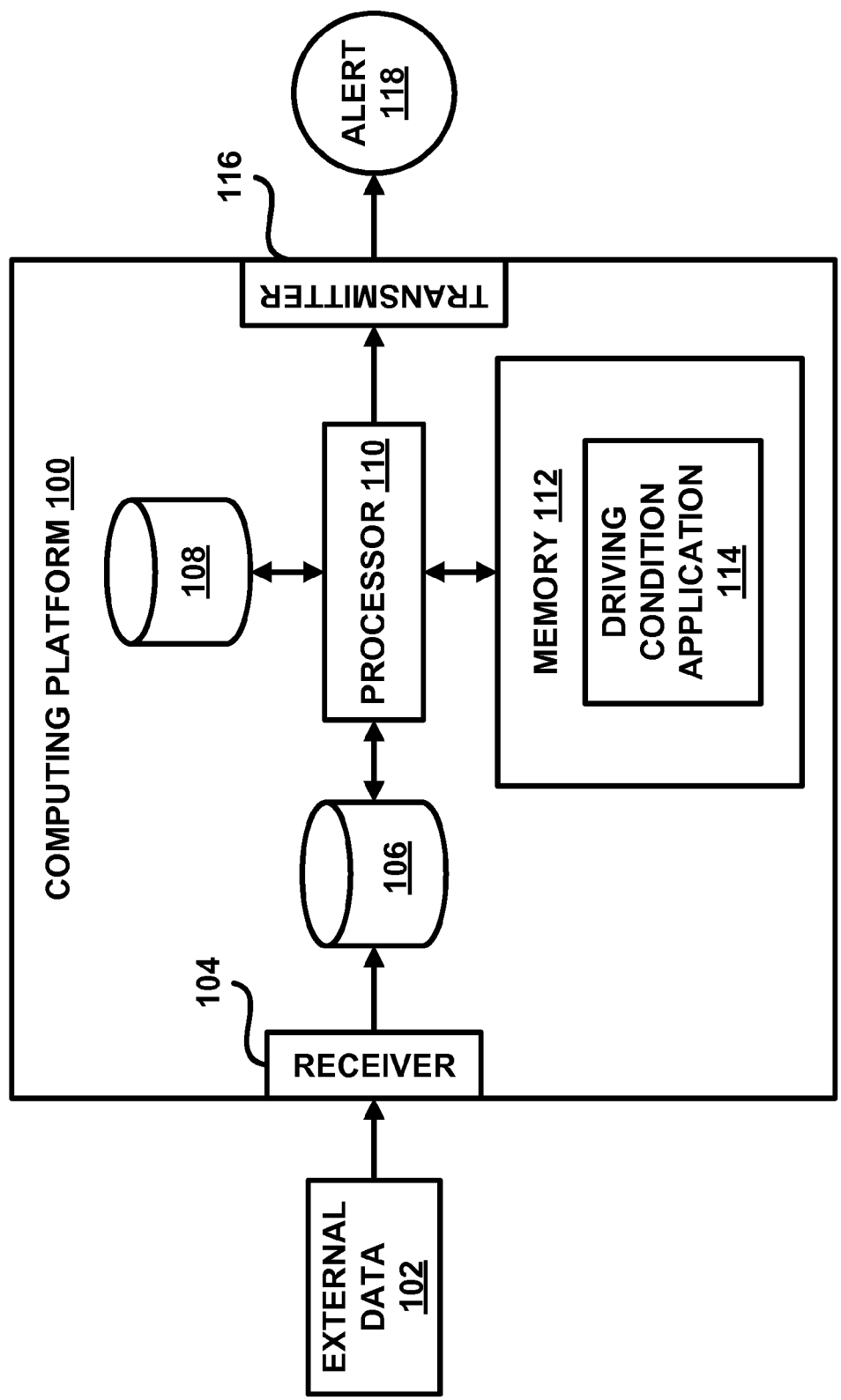
FIG. 1 is a block diagram of a system for providing driving condition alerts, according to an example.

FIG. 1 is a block diagram of a computing platform 100 for providing driving condition alerts. The computing platform 100 includes a processor 110 operable to execute a driving condition application 114, preferably stored in nonvolatile memory 112. The driving condition application 114 may generate a driving condition alert message 118 based on a combination of data stored in a data store 108 and external data 102, which is received by the computing platform 100 via a receiver 104 and stored in a data store 106. If the driving condition application 114 generates a driving condition alert message 118, the processor 110 provides the alert message 118 to users via a transmitter 116. The alert message 118 may be received by a navigation system or other device (e.g., cellular telephone, personal navigation device, laptop computer), which then provides an audible alert, a visual alert, a haptic alert, or any other type of alert to the device user.

FIG. 1 depicts that the computing platform 100 includes two data stores 106, 108 to distinguish that some of the data used by the driving condition application 114 may already be located on the computing platform 100, while some of the data used by the driving condition application 114 is acquired by the computing platform 100 (external data 102) via the receiver 104. However, it is understood that the computing platform 100 may have a single data store. It is also understood that the computing platform 100 may have more than two data stores. For example, the computing platform 100 may have a data store for each type of data used by the driving condition application 114.

The driving condition application 114 may use map data in conjunction with a combination of real-time, historic, and forecast traffic data; real-time, historic, and forecast weather data; and/or event data to determine whether to generate a driving condition alert 118. The external data 102 includes at least the data that is likely to change at a rate such that frequent updates (daily or more often) to the data store 106 are used to generate the alert 118. For example, the external data 102 includes the real-time traffic and weather data. The term "real-time" as used in this description denotes that collected data is delivered to the computing platform 100 in a timely manner with delays as need to transfer the data from the data collection point to the computing platform 100. Other data, such as historic traffic and weather data, may be stored in the data store 108, and may be updated at a less frequent rate. For example, the data in the data store 108 may be updated as part of a routine update, such as a monthly update.

Figure 2A:
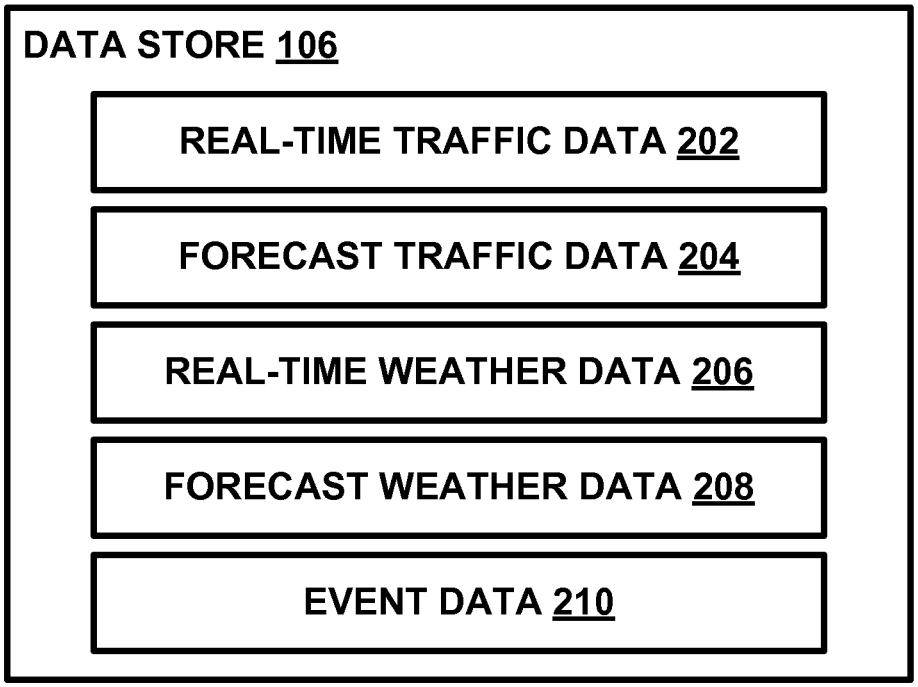
FIG. 2 is a block diagram showing the types of data the system depicted in FIG. 1 may use to generate the driving condition alert, according to an example.
Figure 2B:
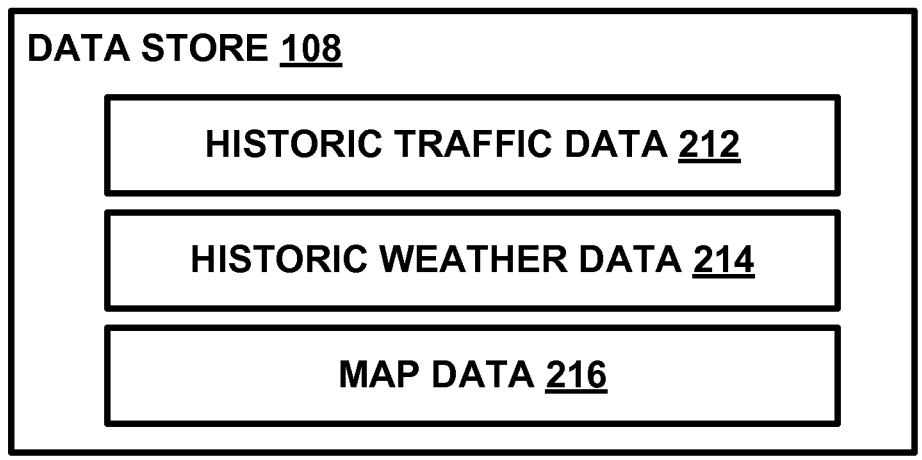

FIG. 2 depicts some of the data attributes that may be stored in the data stores 106, 108. FIG. 2A depicts that the data store 106 includes data attributes for real-time traffic data 202, forecast traffic data 204, real-time weather data 206, forecast weather data 208, and event data 210. FIG. 2B depicts that the data store 108 includes data attributes for historic traffic data 212, historic weather data 214, and map data 216. It is understood, that the data store 106 may include data attributes depicted in FIG. 2B and the data store 108 may include data attributes depicted in FIG. 2A. For example, the computing platform 100 may receive map data 216 from external sources as needed for a particular analysis performed by the driving condition application 114. It is also understood, that the data stores 106, 108 may store other data types not depicted in FIG. 2, such as terrain model data.

The data 202-216 are associated with location information. The location information may include geographical coordinates (e.g., latitude, longitude, and altitude), traffic codes (e.g., Radio Data System Traffic Message Channel (RDS-TMC) codes and Vehicle Information and Communication System (VICS) codes), road segment identifications, grid or tile identifications, and/or any other method of identifying a location in the real world. For example, the traffic data 202, 204, 212 may be associated to specific road segment identifiers. As another example, the weather data 206, 208, 214 may be associated with a spatial reference, such as latitude/longitude, or a bounding rectangle or polygons defined by latitude/longitude. Additionally, the data 202-214 and optionally the data 216 are associated with date and time information associated with when the data was collected.

The real-time traffic data 202 may include sensor data, probe data, and/or incident data. The sensor data is data collected from roadway sensors. The sensors may use radar, acoustics, video, and embedded loops in the roadway to collect data that can be used to characterize traffic conditions. For example, the sensor data may include speed, volume (number of vehicles passing the sensor per period of time), and density (percentage of the roadway that is occupied by vehicles). The sensor data may include other data types as well, such as vehicle classification (e.g., car, truck, motorcycle).

The probe data is point data collected from a moving vehicle having a device that can identify vehicle position as a vehicle travels along a road network. For example, the device may use cellular technology (e.g., cell handover) or Global Positioning Satellite (GPS) technology to monitor the vehicle's position on the road network. By monitoring the vehicle's movement, the probe data can be used to determine travel time, which can then be used to calculate speed of the vehicle.

The incident data is traffic data regarding a traffic event that obstructs the flow of traffic on the road system or is otherwise noteworthy in reference to traffic. Example incidents include accidents, congestion, construction, disabled vehicles, and vehicle fires. A traffic operator may enter the incident data into a Traffic Incident Management System (TIMS), such as the TIMS described in U.S. Patent Publication No. 2004/0143385, which is assigned to the same assignee as the current application. U.S. Patent Publication No. 2004/0143385 is hereby incorporated by reference in its entirety. A traffic operator is a person who gathers traffic information from a variety of sources, such as by monitoring emergency scanner frequencies; by viewing images from cameras located adjacent to a roadway; and by calling government departments of transportation, police, and emergency services. In addition, the traffic operator may obtain traffic data from aircraft flying over the road network.

The forecast traffic data 204 includes data that predicts traffic conditions in the near future. For example, the forecast traffic data 204 may predict the duration and length of a traffic jam resulting from congestion or other traffic incident. The forecast traffic data 204 may also be able to predict future traffic speeds and/or congestion problems based on increased traffic volume in a particular area at a particular time. The forecast traffic data 204 may be generated by analyzing the real-time traffic data 202 and/or the historic traffic data 212. For example, a traffic data collection center, such as the virtual geo-spatial traffic network (VG-STN) described in U.S. Patent Publication No. 2004/0143385, may analyze the sensor and probe data to determine whether congestion is building, steady, or receding on a road. The forecast traffic data 204 may include data that predicts other traffic conditions as well.

The real-time weather data 206 includes information obtained from a variety of weather sensors or systems, such as weather radars (e.g., the NEXRAD weather radar system), weather satellite imagery, weather information from remote, locally manned, and/or automated weather stations, and so on. The real-time weather data 206 may also include weather observation reports that are manually entered into a weather management system. The real-time weather data 206 may include information regarding wind speed, rainfall, humidity, temperature, barometric pressure, visibility, and so on.

The forecast weather data 208 may be obtained using a computer implemented weather forecasting model. The weather forecasting model generates weather forecast data for a geographic area based on the real-time weather data 206 and/or the historic weather data 214. An example of such a weather forecasting model is the Weather Research and Forecasting (WRF) Model.

The event data 210 includes information regarding scheduled and unscheduled events. The events include civic, social, and sporting events. The event data 210 may be used to forecast traffic flow and incidents, such as congestion and road closures. The event data 210 includes information regarding start and end time (if known) and location. For example, the event data 210 may include the start time of a baseball game, an estimated end time, and an identification of an area that may be impacted by the occurrence of the baseball game. As another example, an unscheduled demonstration may start in front of city hall. The traffic operator may enter the event data 210 into the TIMS in a similar manner as the incident data. Other systems may also be used to collect information regarding scheduled and unscheduled events.

The real-time traffic data 202, the forecast traffic data 204, the real-time weather data 206, the forecast weather data 208, and the event data 210 may be sent periodically (e.g., every hour) or intermittently (e.g., as changes occur) via a wired or wireless connection to the receiver 104 of the computing platform 100 in the form of one or more data feeds, such as an RSS or XML feed. The receiver 104 is any device or combination of devices operable to receive the external data 102 and store the data in the data store 106. The receiver 104 may also convert the external data 102 into a format used by the processor 110 prior to storing the data 202-210 in the data store 106.

The historic traffic data 212 may include travel time, delay time, speed, and congestion data for various times of the day, days of the week, days of the year, and so on. The historic traffic data 212 may be used to predict clearance time for a traffic event; to predict traffic conditions when sensor data, probe data, and/or incident data is unavailable for a particular roadway; to predict the probability of accidents; or for any other suitable purpose. For example, accidents may be more likely when speeds are variable at certain times of the day. These types of statistics may be determined by analyzing the historic traffic data 212.

The historic weather data 214 may be obtained from the National Oceanic and Atmospheric Administration's (NOAA's) Historical Weather Data Archives or any other supplier of historic weather data. The historic weather data 214 may include average, high, and low temperatures; normal monthly precipitation; average snowfall, wind speed, days of precipitation, and days with sunshine; average morning and afternoon relative humidity; and mean number of clear days, partly cloudy days, cloudy days, and days below 32° F. The historic weather data 214 may include additional weather statistics as well. For example, the historic weather data 214 may include short term historic weather information, such as it snowed yesterday and today the temperature is remaining below freezing, so the snow accumulation from yesterday is unlikely to melt today.

The map data 216 represents the road network in a geographic area. The map data 216 includes the locations (geographic coordinates, including altitude) of roads and data representing intersections, road names, the three-dimensional shape of the roads including curvature, slope and bank, speed limits along roads, turn restrictions at intersections, addresses, the number of lanes each road has, lane width, lane markings, functional classes of roads, the locations of medians, road signs, and so on. The map data 216 may also includes information about other geographic features, such as bodies of water, parks, administrative areas (including municipal, state and country boundaries), and locations of points of interest, such as businesses, hospitals, police stations, and so on.

For purposes of this specification, the map data 216 is generally described as having road location data and road attribute data. The road location data includes data that represents the physical location of roads. The road attribute data includes data that represents road features that may impact driving conditions, such as the shape of the road (e.g., curvature, slope, elevation, grade, bank, width), lane characteristics (e.g., number, width, markings, changes), regulations (e.g., speed limits, turn restrictions, direction of travel), and road type (e.g., bridge, tunnel, pavement type). The road attribute data also includes information regarding warning signs that are placed adjacent to the road to warn drivers of potentially hazardous conditions, such as sharp turns, steep elevations, road narrowing, and so on.

Returning to FIG. 1, the driving condition application 114 is a software program or routine that runs on the computing platform 100. The computing platform 100 may be a server, a navigation system, a personal computer (PC), a plurality of computers coupled together for parallel computing applications, or any other computer or computer system. The driving condition application 114 is stored on the computer-readable storage media 112 and run by the processor 110 on the computing platform 100. The computer-readable storage media 112 may be located within the memory of the computing platform 100, such as ROM, RAM, and hard disks. Alternatively, the computer-readable storage memory 112 may be located external to the computing platform 100, such as on a flash drive or a CD-ROM disc, which is accessed by the computing platform 100 when the memory is connected to computing platform 100.

The driving condition application 114 combines the map data 216 with the traffic, weather, and/or event data 202-214 to determine a risk of hazardous driving conditions. For example, the driving condition application 114 may combine the following attributes:

'fog in the area' and 'lane information' indicating reduction from 3 lanes to 2 lanes';
'windy conditions' and 'bridge' or 'windy conditions' and 'road sign: beware of lateral winds';
'icy conditions' and 'bridge';
'icy conditions' and 'slope' indicating steep grade;

'low visibility' and 'road sign: sharp curve' or 'low visibility' and 'road curvature attributes' indicating sharp curve;

'heavy precipitation' and 'low altitude' indicating possible flooding;

'congestion, tailback growing' and 'road sign: sharp turn ahead';

'low visibility' and 'construction' and 'black spot' (location that experiences high number of accidents);

'low visibility' and 'construction' and 'sharp curve';

'low visibility' and 'accident with lanes blocked' and 'black spot';

'icy' and 'accident' and 'sharp curve'; and

'icy' and 'construction' and 'sharp curve'.

These are just a few of the many combinations that the driving condition application 114 may evaluate to determine whether to generate a driving condition alert message 118.

Figure 3:
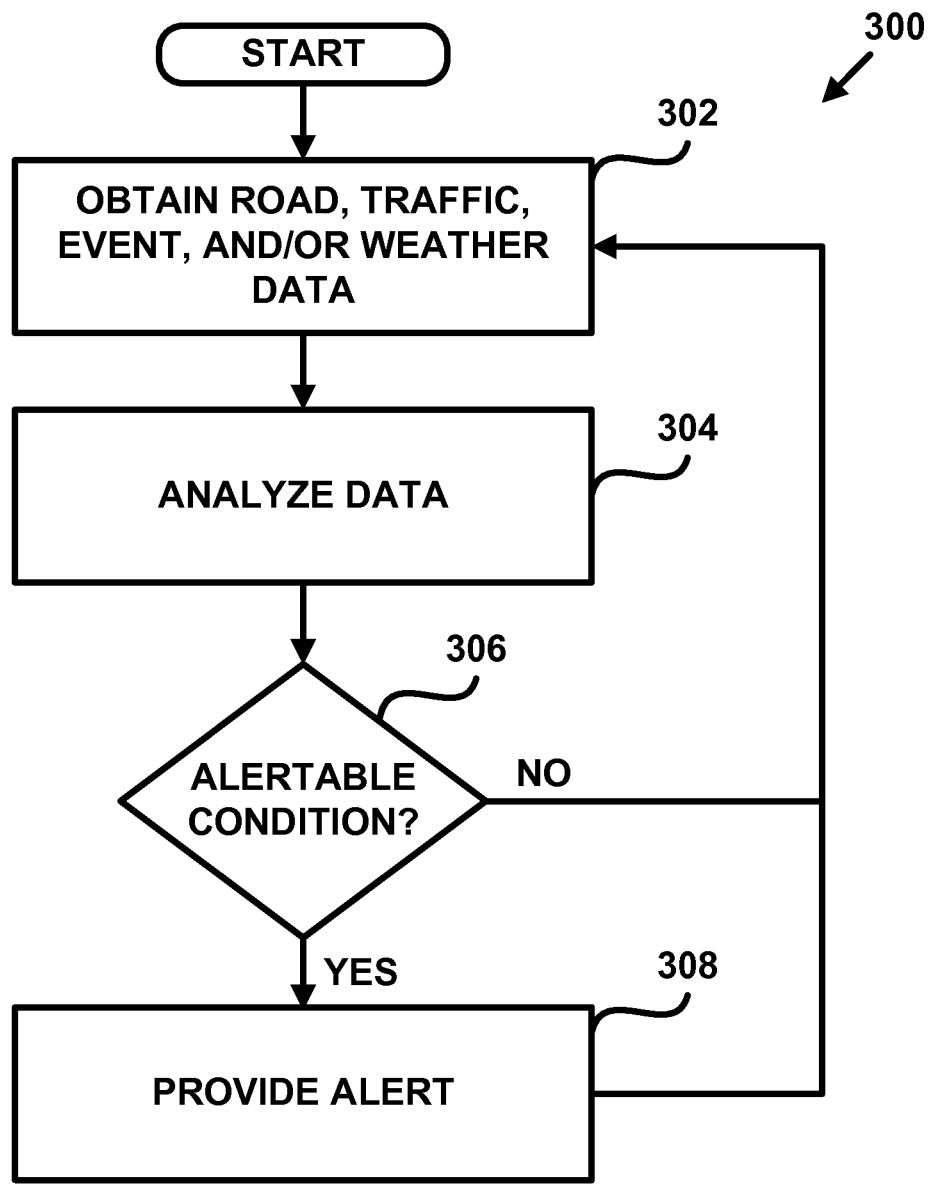
FIG. 3 is a flow chart of a method for providing driving condition alerts, according to an example.

FIG. 3 depicts a method 300 for providing a driving condition alert. At block 302, the driving condition application 114 obtains data from the data stores 106, 108. The data includes the map data 216 with any combination of the traffic data 202, 204, 212, the weather data 206, 208, 214, and the event data 210. The processor 110 controls the distribution of the data from the data stores 106, 108 to the driving condition application 114.

Figure 4:
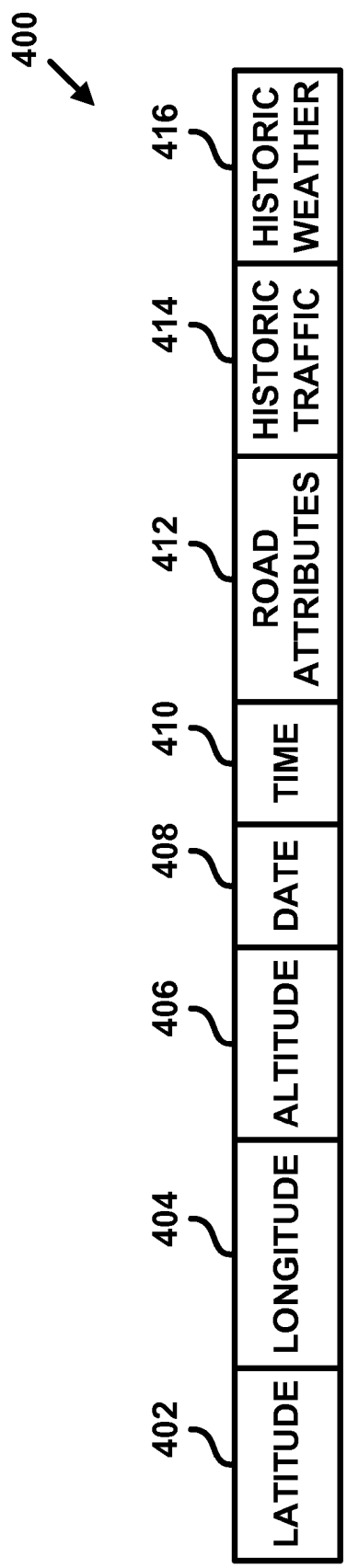
FIG. 4 is a block diagram of a baseline data entity that may be used in the method depicted in FIG. 3, according to an example.

At block 304, the driving condition application 114 analyzes the received data. Preferably, the driving condition application 114 starts with a data baseline associated with geographic location information. For example, FIG. 4 shows an example data baseline 400. The baseline 400 is organized by location. In this example, the location is represented by latitude, longitude, and altitude data 402-406. However, the location may be represented using other geographical referencing systems, such as RDS-TMC traffic codes, road segment identifiers, and grid identifiers.

The baseline 400 is also organized by date and time 408, 410. The date data 408 may include the day of the week in addition to the day, month, and year. The time data 410 may be a range of time, such as a fifteen minute time period. Alternatively, the time data 410 may identify a point of time, such as every second, every minute, every two minutes, and so on.

For each location 402-406, the baseline 400 includes road attribute data 412 that represent features that may impact driving conditions. As described with reference to FIG. 2, the road attribute data 412 is included in the map data 216. The road attribute data 412 include information regarding the shape of the road, such as curvature, slope, bank, and width of the road. The road attribute data 412 may also include lane information, such as number of lanes, lane width, lane markings, and lane changes (e.g., lane reductions). The road attribute data 412 may also include regulatory information, such as speed limits, turn restrictions, and direction of travel. The road attribute data 412 may also include information regarding other characteristics of the road, such as pavement type and whether the road is located on a bridge and/or in a tunnel. The road attribute data 412 may also include information regarding placement and content of warning signs, such as "slippery when wet," "road narrows," "curve ahead," "high winds," and so on. The road attribute data 412 may also include a null value when a location does not include features that may impact driving conditions.

For each location 402-406 and date/time 408-410, the baseline 400 includes historic traffic data 414 and the historic weather data 416. The historic traffic data 414 and the historic weather data 416 are included in the historic traffic data 212 and the historic weather data 214, respectively. For example, on Monday, December 1st at 7 am, a driver on I-290 in Chicago, Ill. is likely to experience heavy congestion with overcast skies. As another example, at the same day and time, a driver on US-60 in Tempe, Ariz. is likely to experience moderate congestion with sunny skies.

Starting with the baseline 400 of expected conditions, the analysis at block 304 identifies changes from the baseline 400. The changes may be a result of traffic, weather, and/or event conditions. The baseline 400 may evolve over time as new data becomes available or conditions change (e.g., new roads, road widening, bridge collapse). Of course, the analysis at block 304 may also be conducted without using the baseline 400.

With or without the baseline 400, the driving condition application 114 uses one or more analytical routines or methodologies to identify driving conditions that are appropriate for generating an alert. For example, the driving condition application 114 may use a decision tree, an object model, a neural network, and/or a genetic algorithm. The driving condition application 114 may use other methodologies now known or developed in the future to analyze the data at block 304.

Figure 5:
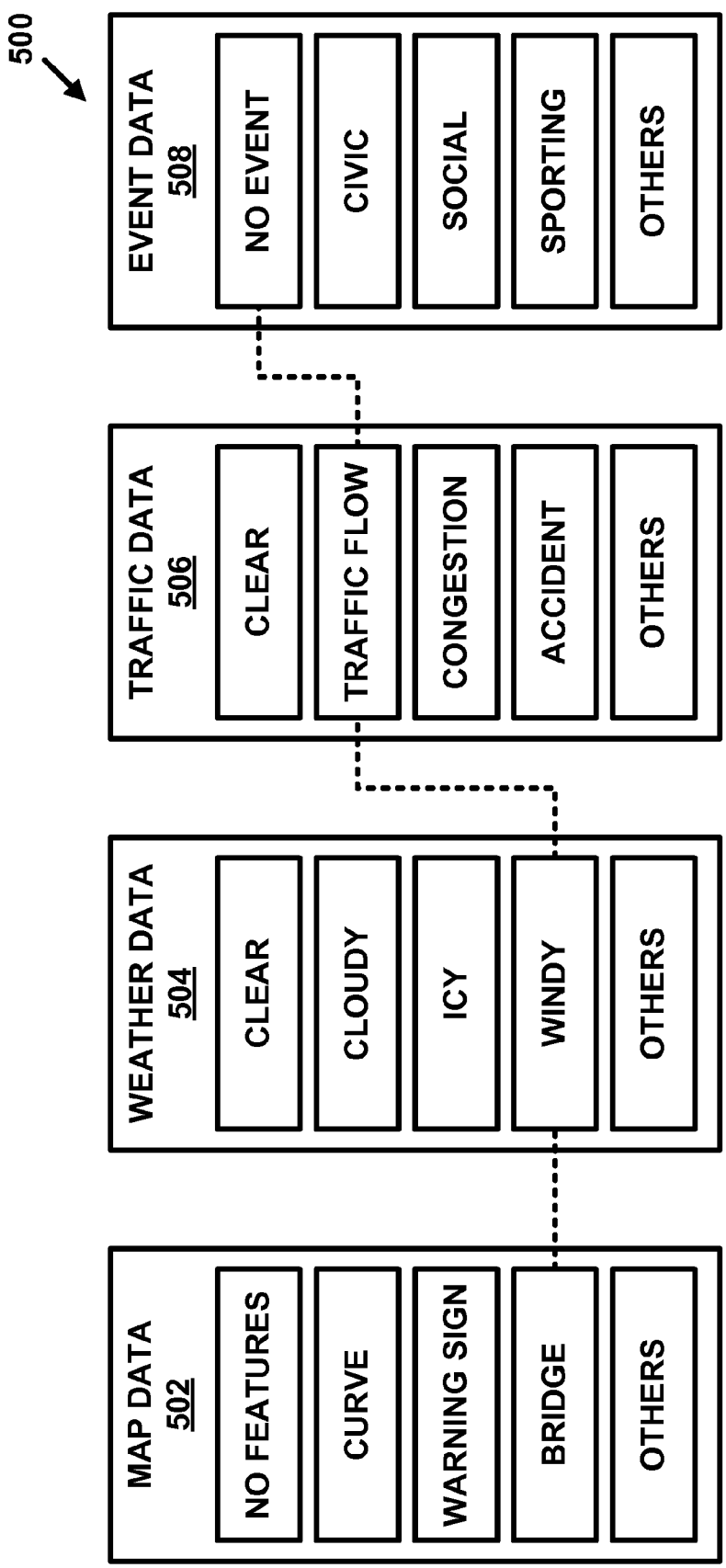
FIG. 5 is a block diagram of a decision tree for determining whether to generate a driving condition alert, according to an example.

FIG. 5 shows a block diagram of a decision tree 500 that may be used to analyze whether to generate a driving condition alert message. A decision tree (or tree diagram) is a tool that uses a tree-like graph or model of decisions and their possible consequences. In the example depicted in FIG. 5, the decision tree 500 starts with map data 502. It is understood that the decision tree 500 may start with other data types. Based on the location currently being analyzed at block 304, the driving condition application 114 determines whether the location is associated with map data 502 that may impact the decision regarding whether to generate a driving condition alert. In this example, the location is associated with the road attribute of "bridge."

In this example, the decision tree 500 has a rule to check real-time weather data 504 for "low visibility," "icy," and "high wind" if the map attribute of "bridge" is found at a location. Of course, other rules may be written. It is determined that current weather conditions at this location include high winds. The decision tree 500 may then check the forecast and historic weather data (not shown separately for simplicity) for the location.

Continuing with this example, the decision tree 500 has a rule to check real-time traffic data 506 for "traffic flow" or "incidents." It is determined that traffic flow on the bridge is slow due to the high winds, but moving. The decision tree 500 may then check the forecast and historic traffic data (not shown separately for simplicity) for the location.

The decision tree 500 may then have a rule to check event data 508 for the location. In this example, no events are currently scheduled for the location. Thus, as a result of the analysis at block 304, the driving condition application 114 has identified a bridge that is currently experiencing high wind conditions and the wind conditions are slowing traffic flow over the bridge.

In this example, the condition "high winds" was identified. Industry standards may be used to classify winds or other attributes. Other classification systems may also be used. For example, a jam factor rating as described in U.S. Pat. No. 7,302,341, which is assigned to the same assignee as the current application, may be used to classify traffic congestion. U.S. Pat. No. 7,302,341 is hereby incorporated by reference in its entirety. Alternatively or additionally, discrete attributes for different levels of conditions may be defined within the driving condition application 114. For example, the driving condition application 114 may define for the condition "icy" a discrete event for black ice, patchy ice, thick ice, and so on.

Figure 6:
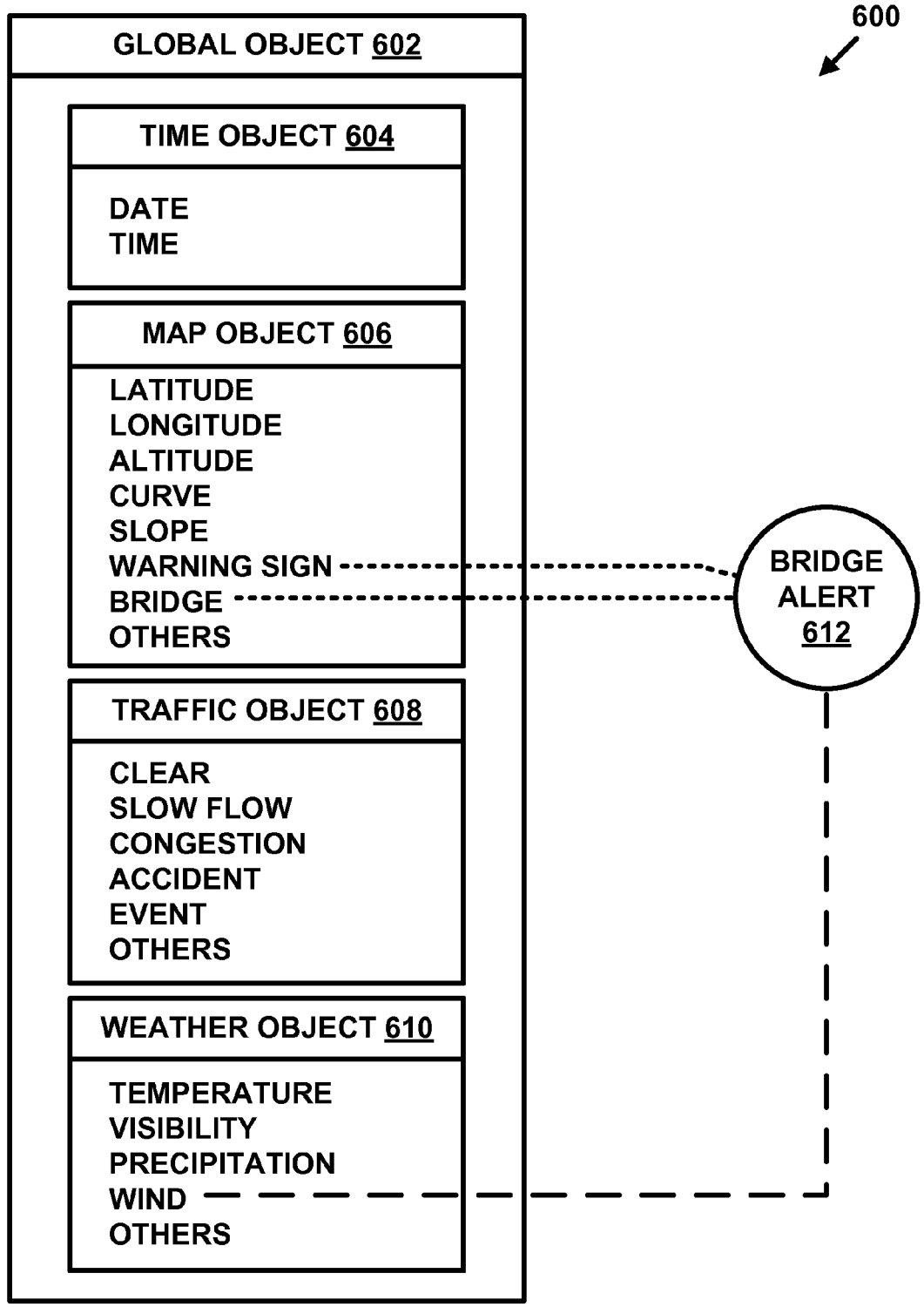
FIG. 6 is a block diagram of a object model for determining whether to generate a driving condition alert, according to an example.

The driving condition application 114 may also use an object model to determine whether to generate a driving condition alert message. Object-oriented programming is a programming methodology that uses "objects" (data structures consisting of data fields and methods) and their interactions to design applications and computer programs. FIG. 6 shows an object model 600 for the same example used with reference to FIG. 5. The object model 600 includes a global object 602. The global object 602 is a model of the real world and, in this example, includes a time object 604, a map object 606, a traffic object 608, and a weather object 610. The global object 602 may include additional objects that define other features of the real world, such as a sun position object.

Predefined relationships exist between the objects. In this example, a bridge alert 612 is defined for the relationship of "wind" in the weather object 610 and "bridge" in the map object 606. Additionally, the bridge alert 612 is defined for the relationship of "wind" in the weather object 610 and "warning sign" for lateral winds in the map object 606. Thus, in this example, the bridge alert 612 relationship is equal to "wind" AND ("bridge" OR "warning sign" for lateral winds). Other relationships may also be defined. For example, a sun glare alert may be defined based on time, topography, visibility, and direction of the road.

A neural network may also be used to determine whether to generate a driving condition alert message. A neural network is composed of a large number of highly interconnected processing elements (neurones) working in parallel to solve a specific problem. Neural networks learn by example. The driving condition application 114 may use the historic traffic data 212 and the historic weather data 214 to train the neural network. As described with reference to block 306 depicted in FIG. 3, the neural network may be used to evolve the weights used to determine whether there is an alertable condition. The neural network may also be used to improve the baseline 400.

A genetic algorithm may also be used to determine whether to generate a driving condition alert message. A genetic algorithm is a search technique used to find exact or approximate solutions to optimization and search problems. Genetic algorithms are a particular class of evolutionary algorithms that use techniques inspired by evolutionary biology such as inheritance, mutation, selection, and crossover (also called recombination). As described with reference to block 306 depicted in FIG. 3, the genetic algorithm may be used to evolve the weights used to determine whether there is an alertable condition. The genetic algorithm may also be used to improve the baseline 400.

Returning to FIG. 3, at block 306, the driving condition application 114 determines whether there is an alertable condition. The driving condition application 114 may use a threshold test to compare results of the analysis at block 304 with a predetermined value. The predetermined value depends on the type of analysis performed and the data attributes used in the analysis. The predetermined value may also be set to zero, meaning that an alert is provided for all driving conditions.

For example, if a decision tree analysis is performed, each attribute identified in a rule may have an associated weight. As the decision tree rules are implemented, the driving condition application 114 generates a score based on a combination of the weights. The driving condition application 114 may add, multiply, or otherwise aggregate the weights to obtain the score and an alert description.

Using the example depicted in FIG. 5, the weights may be: bridge=2, windy=3, reduced speed=1, and no event=0. The driving condition application 114 may add the weights for a score of six. The weights may change based on what attributes are evaluated in a rule. For example, the attribute "icy" may have a different weight when it is being evaluated in a rule that includes "curve" than when it is being evaluated in a rule that includes "bridge." The driving condition application 114 uses a rule engine to define the rules and the associated weights of the attributes used in the rules.

As another example, if the driving condition application 114 uses an object model, a predetermined score may be assigned for each predefined relationship. For the bridge alert relationship 612 depicted in FIG. 6, the driving condition application 114 may have preassigned the score of six.

At block 306, the score or a scaled version of the score is then compared to a predetermined threshold. If the score is equal to or greater than the threshold, then at block 308 the driving condition application 114 provides a driving condition alert. After providing the driving condition alert, the method 300 returns to block 302 where the driving condition application 114 obtains additional data for evaluation. If the score is less than the threshold, the method 300 also returns to block 302. It is understood that other comparison rules may be used when comparing the score with a threshold (e.g., a score lower than a threshold results in providing an alert, the equal condition does not result in providing an alert). The driving condition application 114 may also use tests other than a threshold test to determine whether to provide a driving condition alert.

At block 308, the driving condition application 114 generates an alert message, which the processor 110 then forwards to the transmitter 116. The transmitter 116 is any device or combination of devices operable to broadcast the driving condition alert 118. The broadcasting of the alert message includes any form of transmission, including wired and/or wireless transmission. The transmitter 116 may transmit the driving condition alert to an area or to a particular device or devices. Additionally, the transmitter 116 may transmit the driving condition alert based on time, changed conditions, or user request. For example, a user of a navigation system may request an alert based on a planned route. The transmitter 116 may also convert the driving condition alert 118 into one or more formats depending on the intended recipients of the alerts 118.

Figure 7:
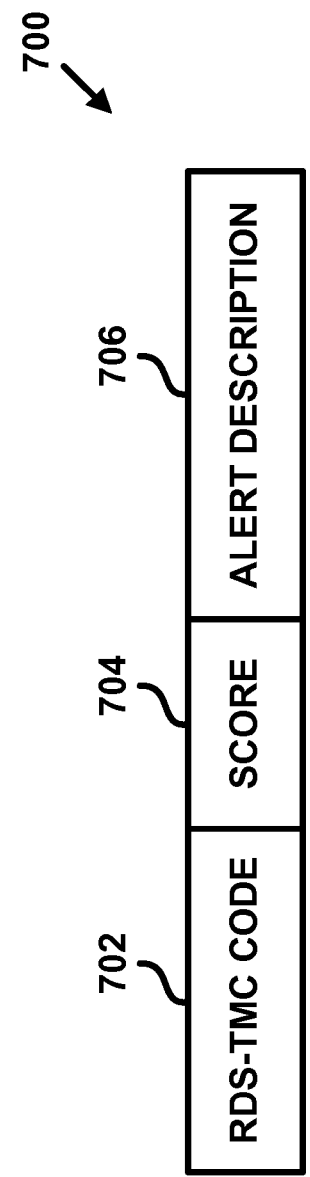
FIG. 7 is a block diagram of a driving condition alert message, according to an example.

FIG. 7 shows a block diagram of a driving condition alert message 700. The alert message 700 includes an RDS-TMC code 702, a score 704, and a alert description 706. In this example, the alert message 700 uses the RDS-TMC code 702 to identify physical location. The alert message 700 may use other location referencing formats, such as geographic coordinates, to identify physical location.

Preferably, the RDS-TMC code 702 conforms to the standard format for ALERT-C messages established in the RDS-TMC system. The RDS-TMC code 702 includes a country code, a location table number, a location number, a direction, and an extent. The location number is a unique number within a region to which one location table (i.e., a database of numbers) corresponds. The location table number is a unique number assigned to each separate location table. The country code is a number that identifies the country in which the location referenced by the location number is located. The direction takes into account road bi-directionality. The RDS-TMC code 702 may be formatted as a string as follows:

ABBCCCCCDE where:
A: Country Code
BB: Location Table Number
CCCCC: Location Number
D: RDS Direction (+, −)
E: Extent (offset from the location in the direction indicated).

Preferably, the score 704 is based on a relative scale (e.g., 1-10 with 1=no hazards and 10=highest hazardous condition). However, the score 704 may be based on other ranking systems, such as a medal system (e.g., gold, silver, bronze), a star system (e.g., zero to five stars, where five stars indicates the best driving conditions), a letter grade (e.g., A, B, C, and F), and a percentage (e.g., 70% chance driving conditions are impacted). The score 704 may be the raw score that the driving condition application 114 calculates. Alternatively, the driving condition application 114 may scale the raw scores to generate the score 704.

The alert description 706 provides the user with context for the score 704. Using the example depicted in FIG. 5, the alert description 706 may be "Reduced speeds at Tacoma Narrows Bridge due to high winds." Other examples include:

- if there is fog and construction but no abnormal road conditions, the alert description 706 may be "low visibility and obstacles";
- if there is fog and road curvature indicates a sharp turn, the alert description 706 may be "low visibility and difficult road configuration";
- if there are icy conditions and road curvature indicates a sharp turn, the alert description 706 may be "slippery and difficult road configuration";
- if there are icy conditions, construction, and road curvature indicates a sharp turn, the alert description 706 may be "slippery, obstacles, and difficult road configuration."

The alert description 706 may be based on one or more factors, such as the three factors having the highest assigned weights. Additionally or alternatively, the alert description 706 may be based on a top weighted factor in each category. The alert descriptions 706 may be stored in a description code table, which is available to the driving condition application 114. For example, the description code table may be stored in the data store 108.

The alert message 700 may also include additional information, such as a probability of risk code and a confidence level code. The probability of risk code may indicate a level of risk above normal driving conditions. For example, a probability of risk code equal to ten may indicate that driving conditions are ten times more hazardous than normal driving conditions. The confidence level code may indicate an expected accuracy of the generated driving condition alert 118. For example, the confidence level code may indicate the likelihood that a driver will experience slow traffic over the bridge during windy conditions is 70%. This additional information may be included in the alert description 706.

The vehicles and devices in the region that have appropriate equipment installed and operating in them receive the driving condition alert message 700. The message 700 can be provided to the drivers, passengers, or other users in the form of an audible alert, a visual alert, a haptic alert, or any other type of alert. As a result, the user may receive information regarding road conditions based on location and/or planned routes. Because this information was generated by analyzing road attribute data in conjunction with one or more of traffic, weather, and event data, the information received by the user is more accurate than previously available.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for providing driving condition alerts using road attribute data stored in a geographic database, the method comprising:
    obtaining road location data, road attribute data, real-time traffic data and forecast traffic data, wherein the road attribute data, the real-time traffic data, and the forecast traffic data are associated with the road location data;
    wherein road attribute data include information regarding a shape of the road including curvature, slope, bank, or width;
    accessing, from a memory, a data baseline associated with the road location data, wherein the data baseline depends on road attributes that represent features of a road that can impact driving conditions and at least one of historic traffic data or historic weather data, wherein the data baseline initially includes expected conditions and changes over time as new road attribute data becomes available;
    calculating, using a processor of a server, a score based on the road attribute data, real-time traffic data, and the forecast traffic data with respect to the data baseline;
    performing a comparison of the score to a predetermined value to determine whether an alertable condition exists when the score is greater than the predetermined value; and
    transmitting, from the server to a navigation device, a driving condition alert if the alertable condition exists based on the comparison.

2. The method of claim 1, wherein the road attribute data includes data representing lane characteristics of the road.

3. The method of claim 1, wherein the road attribute data includes data representing regulations associated with the road.

4. The method of claim 1, wherein the road attribute data includes data representing road type.

5. The method of claim 1, wherein the road attribute data includes data representing warning signs located adjacent to the road.

6. The method of claim 1, wherein the data baseline is organized by location and time.

7. The method of claim 6, wherein for each location, the data baseline includes the road attribute data.

8. The method of claim 6, wherein for each time for a location, the data baseline includes historic traffic data and historic weather data.

9. The method of claim 1, further comprising calculating a score representative of driving conditions and transmitting the score with the driving condition alert.

10. A system for providing driving condition alerts using road attribute data stored in a geographic database, comprising in combination:
- a processor;
- data storage; and
- machine language instructions stored in the data storage executable by the processor to:
- obtain road location data, a road attribute weight, a traffic weight, and a weather weight, wherein the road attribute weight, the traffic weight, and the weather weight are associated with the road location data, wherein road attribute data include information regarding a shape of a road, such as curvature, slope, bank, or width;
- sum the road attribute weight, the traffic weight, and the weather weight to calculate a score;
- access baseline data based on the road location data, wherein the baseline data is initially defined before the road location data is obtained and the baseline data changes over time as new road attribute data becomes available or conditions change;
- compare the calculated score to a predetermined value to determine that an alertable condition exists when the score is greater than the predetermined value; and
- transmit a driving condition alert to a navigation device in response to the alertable condition.

11. A system for providing driving condition alerts using road attribute data stored in a geographic database, comprising in combination:
- a receiver for receiving real-time traffic data, real-time weather data, and event data;
- a memory for storing the real-time traffic data the real-time weather data, the event data, and map data, wherein the map data includes road location data and road attribute data, wherein road attribute data include information regarding a curvature, a slope, a bank, or a width;
- a driving condition application stored in the memory having routines to analyze the real-time traffic data, the real-time weather data, the event data, and map data, in the memory, to calculate a score for at least one combination of the road attribute data and either the real-time traffic data or the real-time weather data that is compared to a predetermined value in order to determine whether an alertable driving condition exists when the score is greater than the predetermined value;
- a processor that executes the driving condition application; and
- a transmitter for transmitting driving condition alert messages to a navigation device when the driving condition application determines that the alertable driving condition exists.

12. The system of claim 11, wherein the at least one combination of the road attribute data and either the real-time traffic data or the real-time weather data includes ice for the real-time weather data and a bridge for the road attribute data.

13. The system of claim 11, wherein the at least one combination of the road attribute data and either the real-time traffic data or the real-time weather data includes ice for the real-time weather data and a steep grade for the road attribute data.

14. The system of claim 11, wherein the at least one combination of the road attribute data and either the real-time traffic data or the real-time weather data includes construction or congestion for the real-time traffic data and a curve for the road attribute data.

15. The system of claim 11, wherein the processor is configured to calculate a score representative of wind for the real-time weather data and a bridge for the road attribute data.

16. The system of claim 15, wherein the transmitter is configured to transmit the score representative of wind for the real-time weather data and the bridge for the road attribute data to the navigation device.

* * * * *